(12) United States Patent
Korobkov et al.

(10) Patent No.: US 8,464,195 B1
(45) Date of Patent: Jun. 11, 2013

(54) INTEGRATED CIRCUIT CLOCK ANALYSIS WITH MACRO MODELS

(75) Inventors: Alexander Korobkov, San Jose, CA (US); Bogdan Tutuianu, The Hills, TX (US); Alexandre Ardelea, Austin, TX (US); Amit Agarwal, Milpitas, CA (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 13/541,127

(22) Filed: Jul. 3, 2012

(51) Int. Cl.
*G06F 17/50* (2006.01)
(52) U.S. Cl.
USPC .......................................... 716/113; 716/112
(58) Field of Classification Search
USPC ................................................ 716/110–116
See application file for complete search history.

(56) References Cited

U.S. PATENT DOCUMENTS

| | | | |
|---|---|---|---|
| 6,732,343 B2 * | 5/2004 | Frerichs et al. | 716/114 |
| 8,095,900 B2 | 1/2012 | Sircar et al. | |
| 2007/0266355 A1 * | 11/2007 | Cha et al. | 716/5 |
| 2011/0046937 A1 | 2/2011 | Kanno | |

OTHER PUBLICATIONS

Kashyap et al. "A Nonlinear cell Macromodel for digital applications" 2007; IEEE pp. 678-685.*
C. Amin et al., A Multi-port Current Source Model for Multiple-Input Switching Effects in CMOS Library Cells; DAC-2006, pp. 247-252.
C. Kashyap et al, A Nonlinear Cell Macromodel for Digital Applications, ICCAD-2007, pp. 678-685.
B. Tutuianu et al., Nonlinear Driver Model for Timing and Noise Analysis, IEEE Trans. on CAD, Nov. 2004, pp. 1510-1521.
L. Pillage and R. Rohrer, Asymptotic Waveform Evaluation for Timing Analysis, IEEE Trans. on CAD, vol. 9, Apr. 1990, pp. 352-366.
E. Freidman, Clock Distribution Networks in Synchronous Digital Integrated Circuits, Proceedings of the IEEE, vol. 89, No. 5, May 2001, pp. 665-692.

* cited by examiner

*Primary Examiner* — Binh Tat
(74) *Attorney, Agent, or Firm* — Miles & Stockbridge P.C.

(57) ABSTRACT

An integrated circuit clock analysis system receives a cell library of gates of the integrated circuit and generates a macro model for each of the gates, where each macro model includes at least one of a nonlinear current source model, an input parasitics model or a nonlinear capacitors model. The system then tunes the macro models and generates a simulation deck from an electrical netlist of a layout of the integrated circuit and the tuned macro models. The system then performs clock analysis simulation based on the simulation deck.

20 Claims, 14 Drawing Sheets

INTEGRATED CIRCUIT CLOCK ANALYSIS WITH MACRO MODELS

FIELD

One embodiment is directed generally to integrated circuit simulation, and in particular to clock analysis simulation of an integrated circuit.

BACKGROUND INFORMATION

Integrated circuit ("IC") design has many phases. One such phase is the testing/verification of the design in which the operation of the integrated circuit is simulated including, for example, simulated logic processing, signal transmission and signal reception. The timing of the integrated circuit design is also simulated. The simulation of the integrated circuit is typically performed by a computer system known as a "test bench." The test bench also includes software for testing the operations of the simulated integrated circuit.

One focus of IC simulation is the "clock network analysis" or "clock analysis", which simulates the propagation of the clock signal over a clock distribution network. The clock signal is used to synchronize different parts of the circuit, and cycles at a rate less than the worst-case internal propagation delays. However, as ICs become more complex, the problem of supplying accurate and synchronized clocks to all the circuits becomes increasingly difficult.

Further, the size of the typical clock distribution network has grown dramatically to hundreds of thousands of devices and greater. However, due to the accuracy requirements, the clock network analysis is typically performed using traditional transistor level circuit simulators with super-linear run time scaling with respect to the number of devices. Although these fast circuit simulators can provide a significant performance improvement over more traditional analysis, the accuracy tradeoff is generally not acceptable for clock skew analysis.

SUMMARY

One embodiment is an integrated circuit clock analysis system. The system receives a cell library of gates of the integrated circuit and generates a macro model for each of the gates, where each macro model includes at least one of a nonlinear current source model, an input parasitics model or a nonlinear capacitors model. The system then tunes the macro models and generates a simulation deck from an electrical netlist of a layout of the integrated circuit and the tuned macro models. The system then performs clock analysis simulation based on the simulation deck.

DETAILED DESCRIPTION

One embodiment is a system that performs clock analysis of an integrated circuit by representing clocking gates, such as complex clock inverter and buffer circuits, with a simplified nonlinear model that includes a nonlinear current source model, an input parasitics model and a nonlinear capacitors model. The system generates initial model parameters and then tunes the parameters to allow for the substitution of clock inverters and buffers by their equivalent model. Therefore, the number of devices in the clock network are reduced and the performance of clock analysis simulation for the IC is substantially improved.

Figure 1:
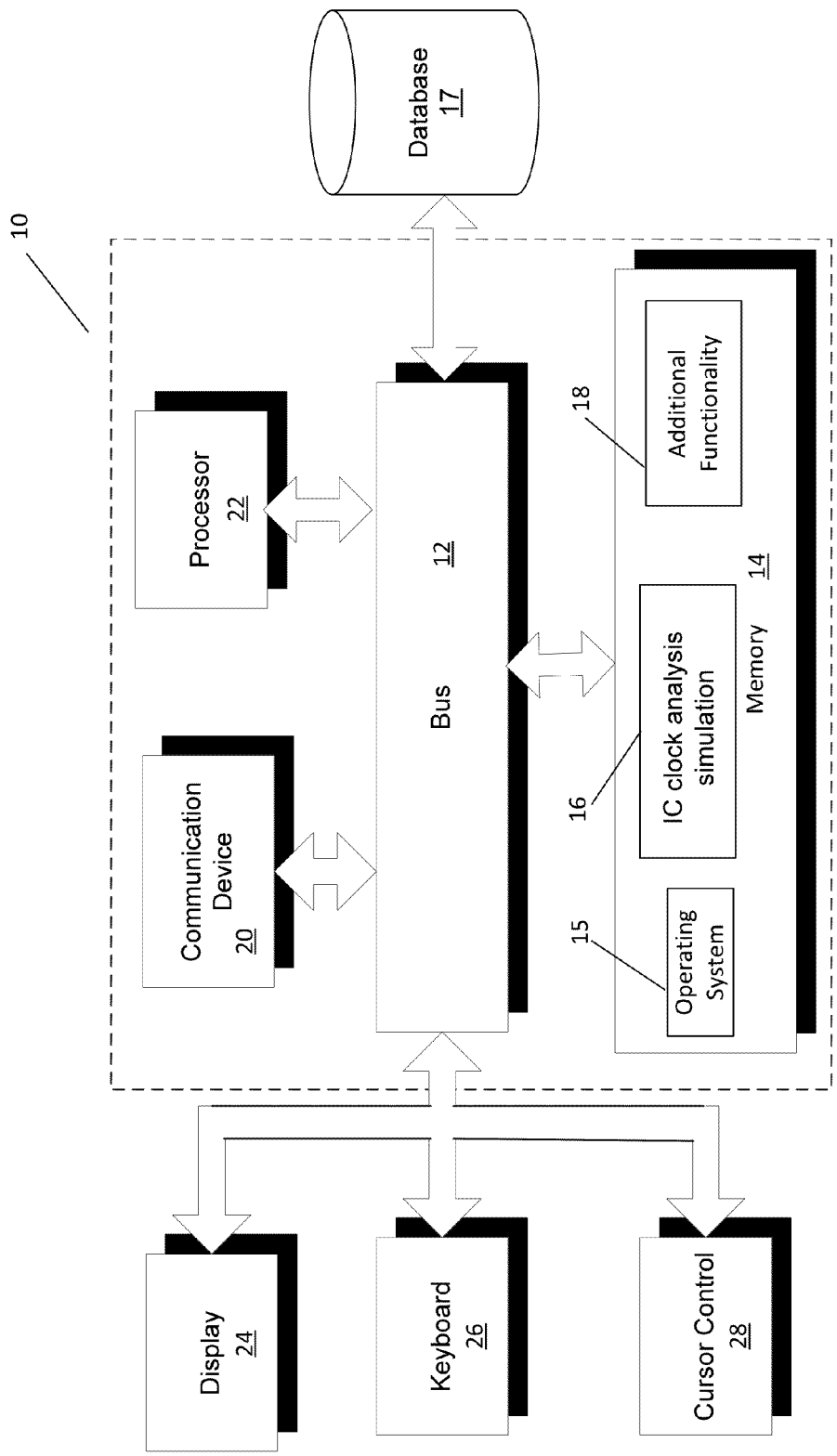
FIG. 1 is a block diagram of a computer server/system in accordance with an embodiment of the present invention.

FIG. 1 is a block diagram of a computer server/system 10 in accordance with an embodiment of the present invention. Although shown as a single system, the functionality of system 10 can be implemented as a distributed system. System 10 includes a bus 12 or other communication mechanism for communicating information, and a processor 22 coupled to bus 12 for processing information. Processor 22 may be any type of general or specific purpose processor. System 10 further includes a memory 14 for storing information and instructions to be executed by processor 22. Memory 14 can be comprised of any combination of random access memory ("RAM"), read only memory ("ROM"), static storage such as a magnetic or optical disk, or any other type of computer readable media. System 10 further includes a communication device 20, such as a network interface card, to provide access to a network. Therefore, a user may interface with system 10 directly, or remotely through a network, or any other method.

Computer readable media may be any available media that can be accessed by processor 22 and includes both volatile and nonvolatile media, removable and non-removable media, and communication media. Communication media may include computer readable instructions, data structures, program modules, or other data in a modulated data signal such as a carrier wave or other transport mechanism, and includes any information delivery media.

Processor 22 is further coupled via bus 12 to a display 24, such as a Liquid Crystal Display ("LCD"). A keyboard 26 and a cursor control device 28, such as a computer mouse, are further coupled to bus 12 to enable a user to interface with system 10.

In one embodiment, memory 14 stores software modules that provide functionality when executed by processor 22. The modules include an operating system 15 that provides operating system functionality for system 10. The modules further include an IC clock analysis simulation module 16 for providing clock analysis functionality, as disclosed in more detail below. System 10 can be part of a larger system, such as a test bed system. Therefore, system 10 can include one or more additional functional modules 18 to include the additional functionality. A database 17 is coupled to bus 12 to provide centralized storage for modules 16 and 18 and store data such as device models, simulation generated data, etc.

Figure 2:
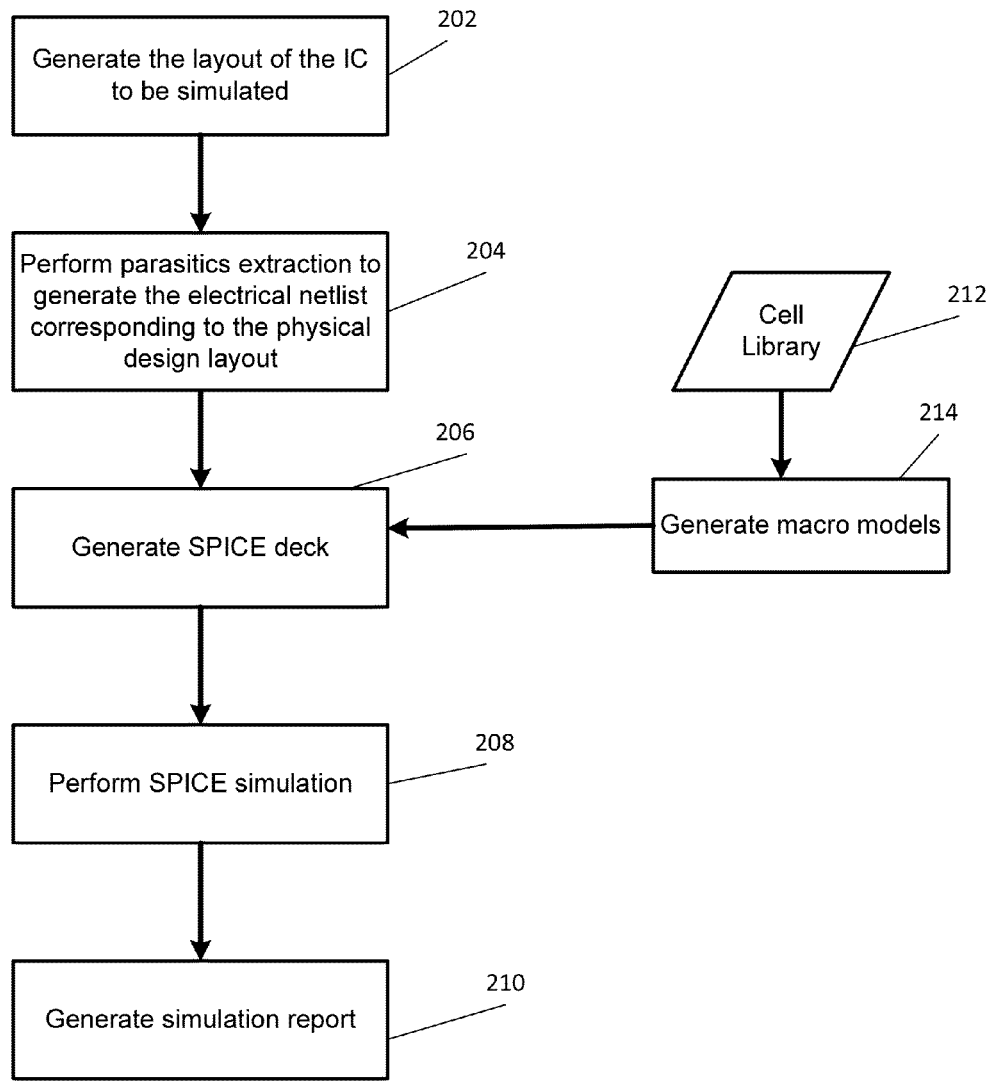
FIG. 2 is a flow diagram of the functionality of the IC clock analysis simulation module of FIG. 1 when performing IC clock analysis in accordance with one embodiment.

One embodiment generates initial model parameters, tunes the parameters, and then uses a known circuit simulator methodology, such as Simulation Program with Integrated Circuit Emphasis ("SPICE") or other type of circuit simulator to perform the simulation for clock analysis. FIG. 2 is a flow diagram of the functionality of IC clock analysis simulation module 16 of FIG. 1 when performing IC clock analysis in accordance with one embodiment. In one embodiment, the functionality of the flow diagram of FIG. 2 (and FIG. 14 below) is implemented by software stored in memory or other computer readable or tangible medium, and executed by a processor. In other embodiments, the functionality may be performed by hardware (e.g., through the use of an application specific integrated circuit ("ASIC"), a programmable gate array ("PGA"), a field programmable gate array ("FPGA"), etc.), or any combination of hardware and software.

At 202, the layout of the IC to be simulated is generated. In one embodiment, the layout incorporates clock nets along with the signal and power nets in the form of physical shapes such as rectangles and polygons associated with fabrication metal layers, as well as metal transitions between the layers such as vias. Further, the layout includes cells of clock gates such as clock buffers and inverters. The cells may be connected by metal wires, forming a tree or grid structure. There may be multiple stages of the clock design connected together through the clock buffers.

At 204, parasitics extraction is performed to generate the electrical netlist corresponding to the physical design layout of the IC. The physical design layout may include resistors and capacitors of the clock interconnects along with coupling capacitors to account for the physical proximity to other nets.

At 206, a simulation deck or "SPICE deck" is generated. The SPICE deck in one embodiment is a text description of the IC to be simulated. SPICE deck generation can match the interconnect ports to the clock buffer inputs and outputs according to the initial layout connectivity, and can produce the circuit netlist which can be handled by transistor level circuit simulation tool. SPICE deck generation also generates appropriate voltage sources and signal measurements to calculate clock delay and skew across the network.

Unlike the resistors and capacitors that form the physical design layout at 204, clock gates (e.g., buffers and inverters) are typically part of a cell library at 212. In prior art clock analysis systems, the library cells are provided directly at 206 when generating the SPICE deck. In contrast, in one embodiment, the cells are used to generate macro models at 214, which are then provided at 206 when generating the SPICE deck. The macro models replace the library cells of 212.

At 208, the SPICE simulation is performed, and at 210 the simulation report is generated. The simulation report may include stage specific and global reports for delays, slew rates and clock skew.

As shown in FIG. 2, the clock buffer or inverter library cell is replaced by a high accuracy compact nonlinear current source based macro model at 214. As disclosed in more detail below, a macro model generation procedure is applied to each library cell associated with the clock network, and the corresponding library of macro models is generated. The macro model is then included into the SPICE deck in place of original netlist at 206, and known circuit simulation tools are used to produce the simulation results.

Figure 3:
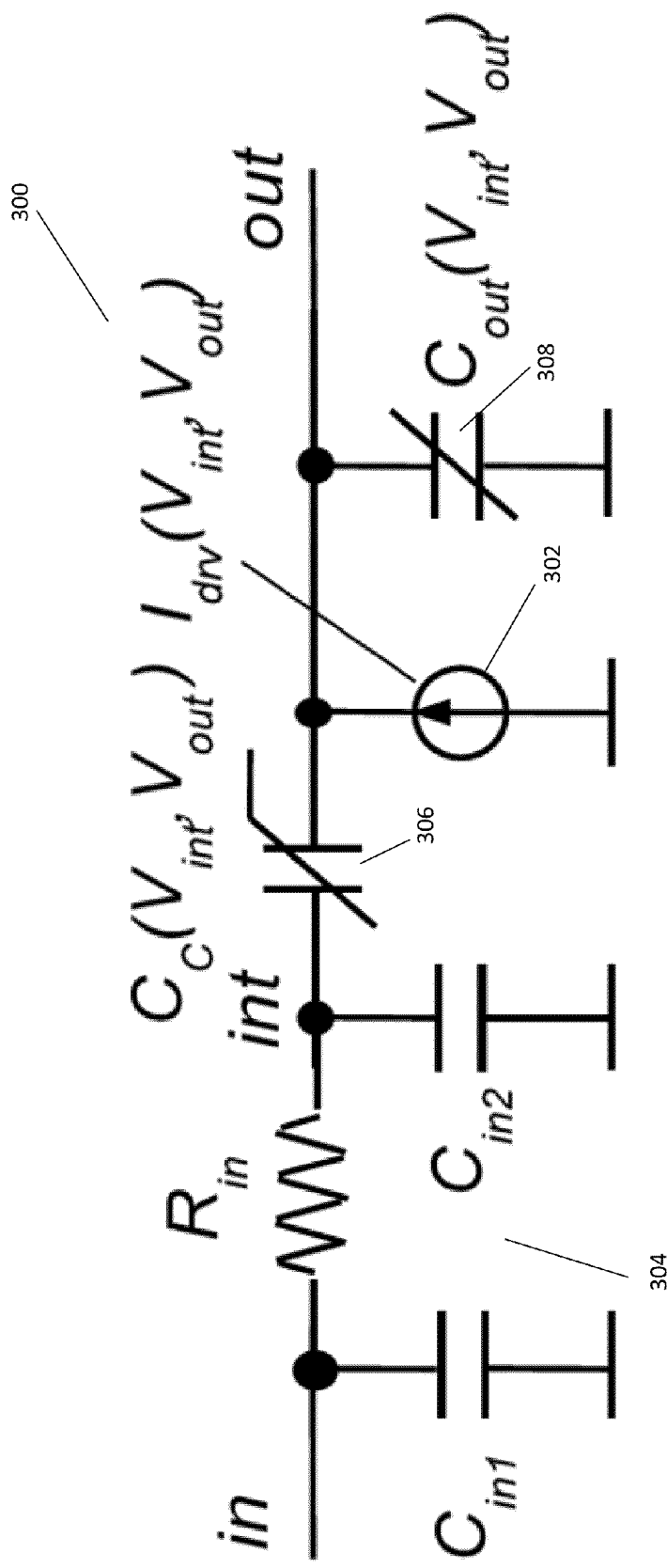
FIG. 3 is a circuit diagram of an inverter macro model in accordance with one embodiment.

In one embodiment, the macro model is suitable for relatively simple gates that include at most two signal inversions, where an input-output signal path can be effectively isolated and accurately modeled. FIG. 3 is a circuit diagram of an inverter macro model 300 in accordance with one embodiment. Inverter model 300 includes three primary parts: (1) a nonlinear current source ($I_{drv}$) 302 which models the output current as a function of input (int) and output voltages (out); (2) an input parasitic load ($C_{in1}$, $C_{in2}$, $R_{in}$) 304; and (3) parasitic nonlinear capacitors ($C_c$ and $C_{out}$) 306 and 308, which model the gate to drain coupling capacitance and the output node capacitance to ground Nonlinear Current Source Model In one embodiment, the non-linear current source models the difference between the current flowing through the N and the P type transistors of the simulated IC, which is the current that charges and discharges the output load. The N and P type transistor currents depend on their gate, drain and source voltages, which are measured at the internal nodes.

In one embodiment of the nonlinear current source model, the input and output voltage range is extended beyond the range for logic 0 and logic 1 because the signals (both at input and output) commonly have overshoot or undershoot. With many typical cases, a significant amount of the active gate transition time is spent with the input signal fully transitioned to the final steady state and with the output approaching its final steady state. Therefore, the accuracy of the gate current should be at the highest level around the steady state points.

Figure 4:
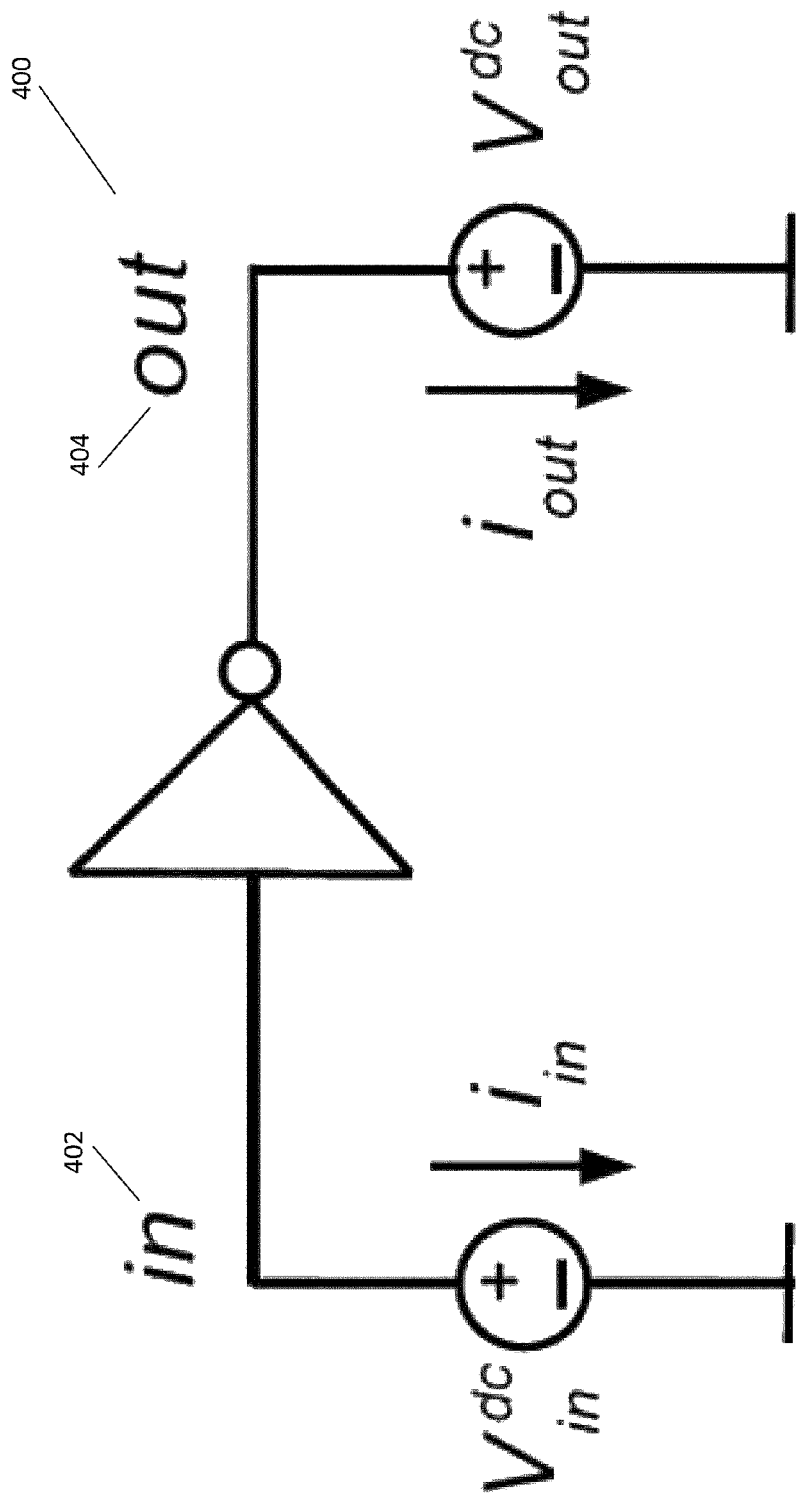
FIG. 4 is a circuit for generating a nonlinear current source model in accordance with one embodiment.

FIG. 4 is a circuit 400 for generating a nonlinear current source model in accordance with one embodiment. The current source is characterized through direct current ("DC") measurements, as shown in FIG. 4. The inverter "in" and "out" nodes (402 and 404, respectively) are set to fixed DC voltages and the output node current is measured. For these settings, the in voltage is the same as the transistor gate voltage ("int" of FIG. 3) under the assumption that the leakage current will create an insignificantly small drop in voltage from input in to the transistor gate in the DC case. The output current goes through the output interconnect parasitic resistance so the output voltage in the DC case matches reasonably well with the drain voltage plus the interconnect voltage drop of the dynamic case, under the assumption that the current that charges and discharges output interconnect parasitic capacitance that is internal to the gate is very small compared to the output node current. Because the gate model is used in a dynamic transient simulation context, the DC current source measurements in one embodiment can be used as a starting point and can then undergo further tuning for improved accuracy.

Under typical operating conditions, the clock inverters have very fast switching input and output signals that will create over-shoot or under-shoot at the output, due to the existing input-output coupling through the transistor gate-to-drain capacitance. Therefore, in one embodiment the normal operating conditions and the characterization range for the gate current source are larger than 0 to 1. The gate model in one embodiment is particularly accurate in the region around the ($V_{in}=0$, $V_{out}=1$) and ($V_{in}=1$, $V_{out}=0$) points due generally to two reasons:

Assuming the case when the input switches from low to high, the output voltage can first increase above 1, then start to switch low towards 0, and the amplitude and time length of this over-shoot is relevant because it defines the moment when the gate actually starts to charge or discharge the output load; an underestimation of the increase in voltage above 1 will result in a gate model output signal that switches faster than the actual gate.

If the input signal will finish switching while the output signal is still active, the output current source values are going to be very sensitive to small changes in the input signal; if the model has inadequate accuracy around the $V_{in}=1$ or $V_{in}=0$ points, the output signal accuracy is greatly diminished.

Figure 5:
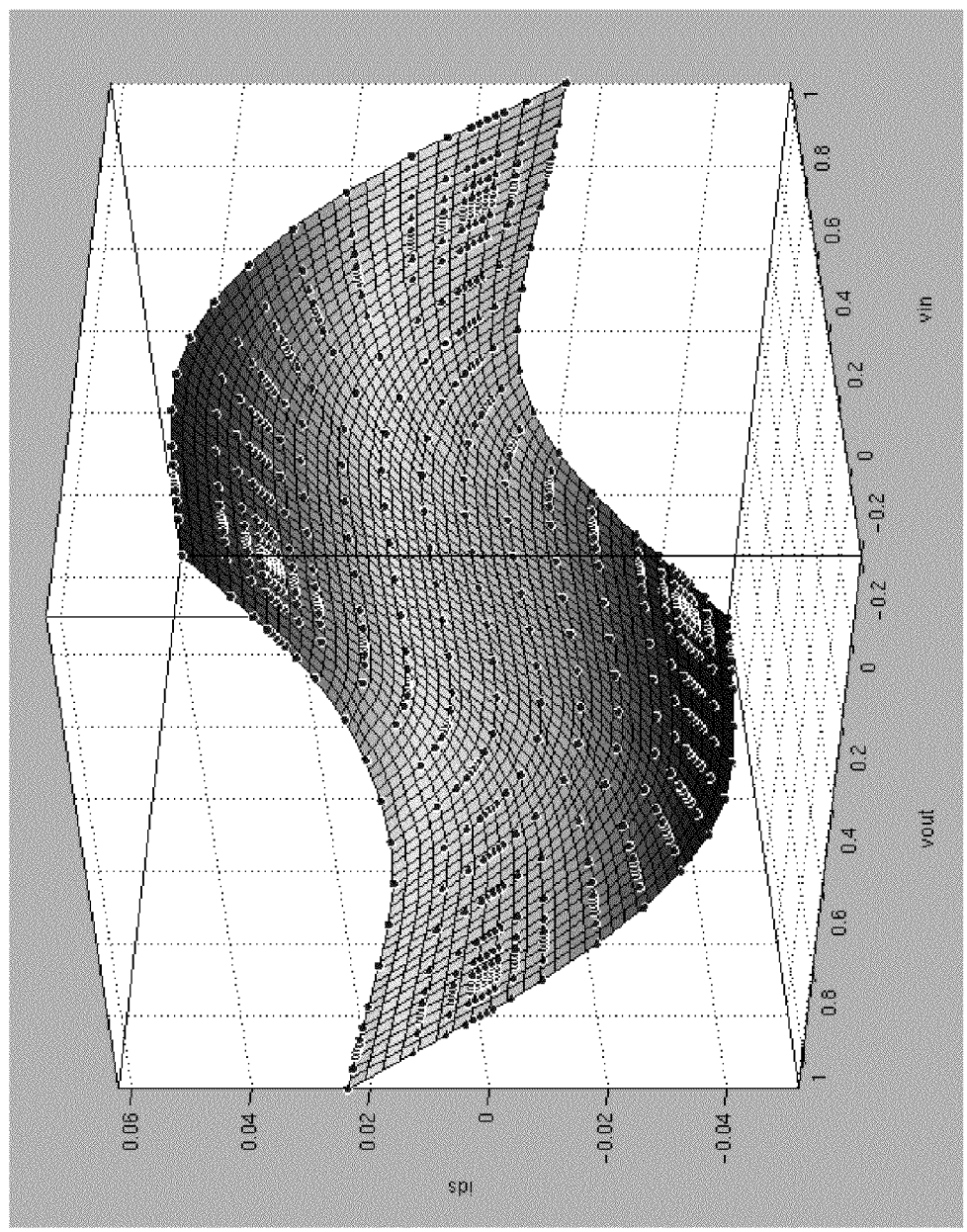
FIG. 5 is a scaled graphical representation of the output DC current of the nonlinear current source model of FIG. 4 measured as a function of input and output DC voltage in accordance with one embodiment.
Figure 6:
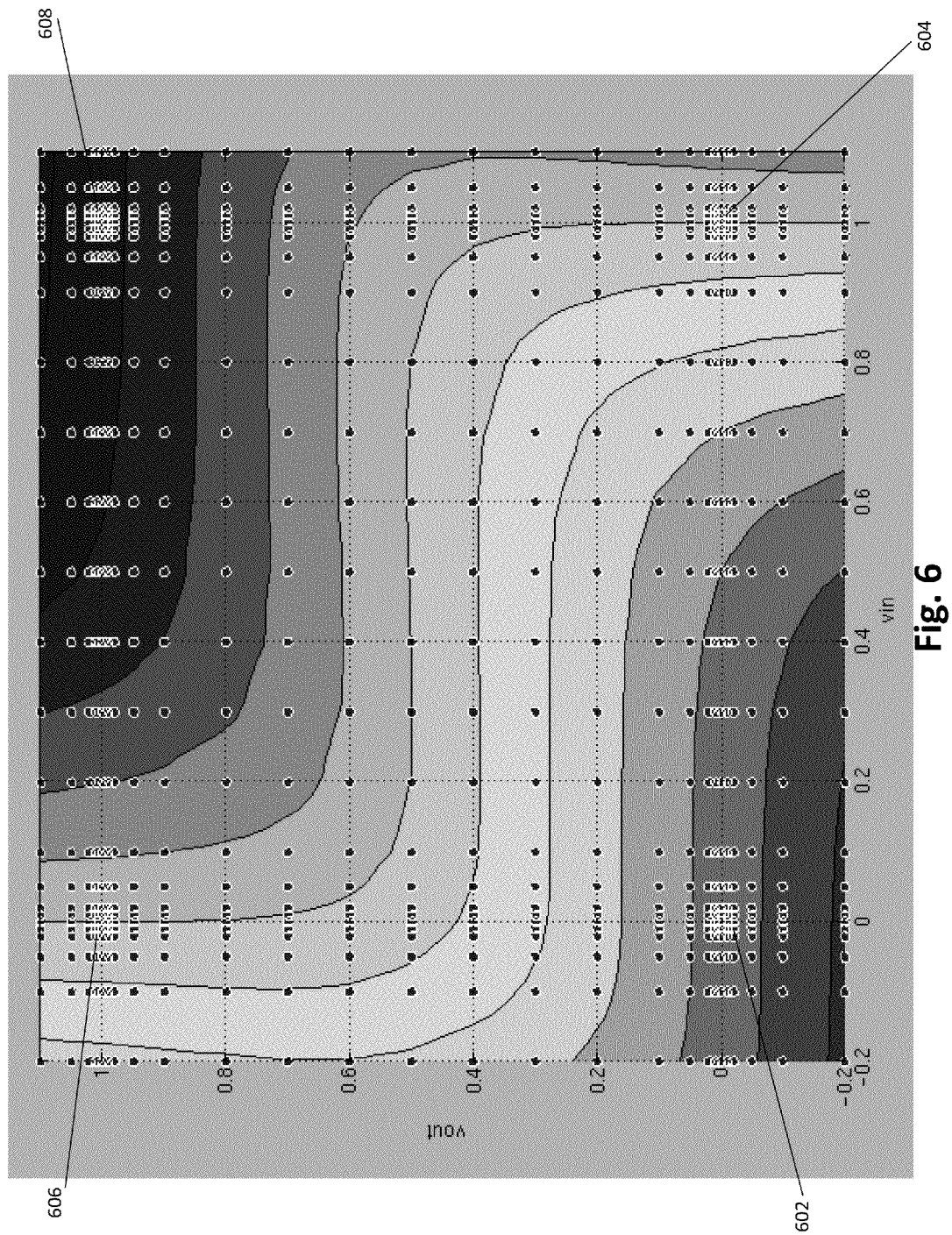
FIG. 6 is a contour plot of the gate output DC current of FIG. 5 with variable density of measurements in accordance with one embodiment.

FIG. 5 is a scaled graphical representation of the output DC current of nonlinear current source model 400 of FIG. 4 measured as a function of input and output DC voltage in accordance with one embodiment. FIG. 6 is a contour plot of the gate output DC current of FIG. 5 with variable density of measurements in accordance with one embodiment. As shown in the plot of FIG. 6, there is a higher density of points around the (0,0), (0,1), (1,0) and (1,1) corners (corners 602, 604, 606 and 608, respectively).

Figure 7:
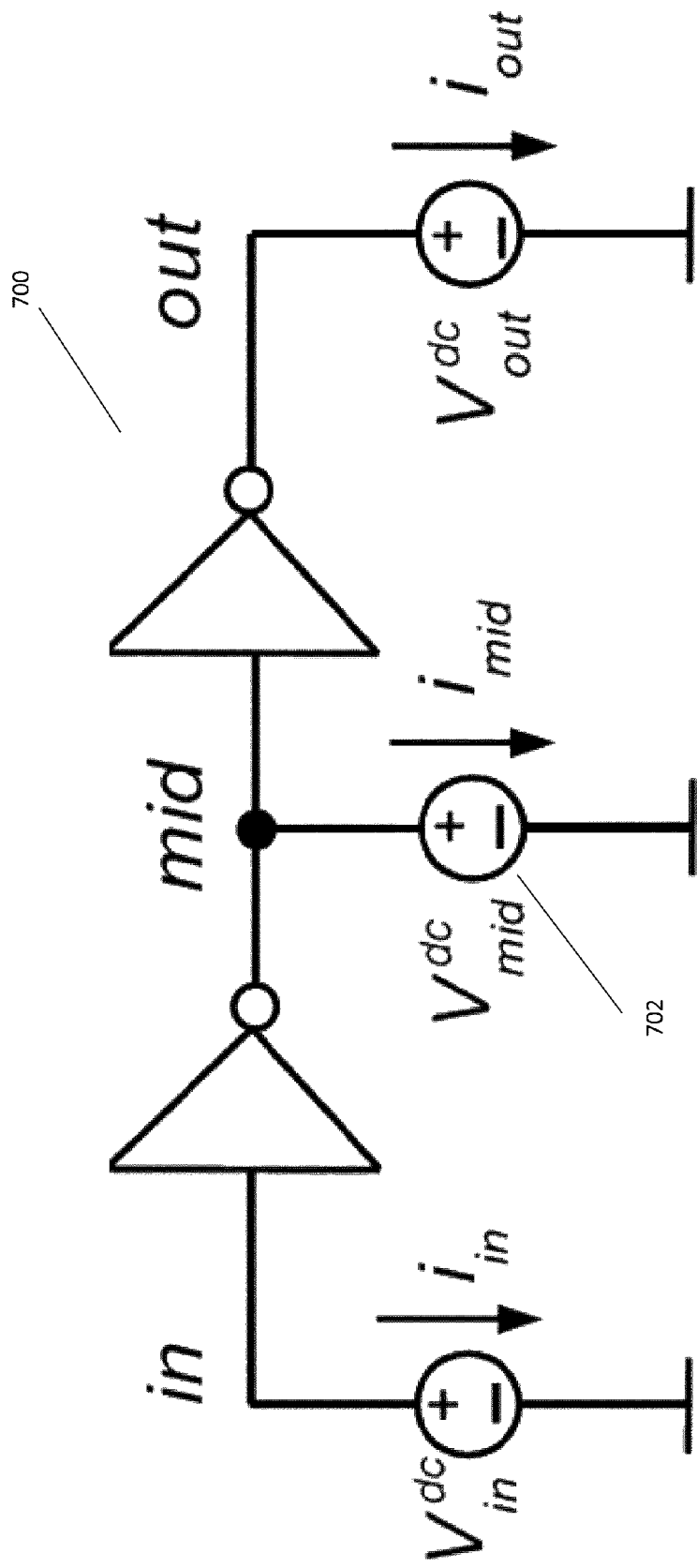
FIG. 7 is a circuit for generating a nonlinear current source model for a buffer or repeater in accordance with one embodiment.

In one embodiment, for a buffer or repeater, where two inverters are connected one after another, the characterization identifies an internal circuit node. The gate operating point is created using three DC voltage sources. FIG. 7 is a circuit 700 for generating a nonlinear current source model for a buffer or repeater in accordance with one embodiment. In the DC case, the current flowing through the middle node voltage source 702 is the same as the DC output current of the first inverter. In this embodiment, inverter model 300 of FIG. 3 is simply extended to two inverters, one after another.

In embodiments of the nonlinear current source model, the voltage at the input node is slightly different from the voltage at the gate of the transistor due to the parasitic resistance and capacitance. For inverters with very large number of transistor fingers, this small offset can be significant compared to the gate delay. Therefore, the input parasitic load model has the resistance $R_{in}$ to model the voltage difference, and for this reason the current source is dependent on the internal node ("int") voltage, not the input ("in") voltage for model 300 of FIG. 3. In one embodiment, the DC current sources are modeled using hardware description language (e.g., Verilog) models within the model netlists. In one embodiment, the current sources model the surface plots of FIGS. 5 and 6, and are then tuned/optimized using a lookup table.

Input Parasitics Model

Figure 8A:
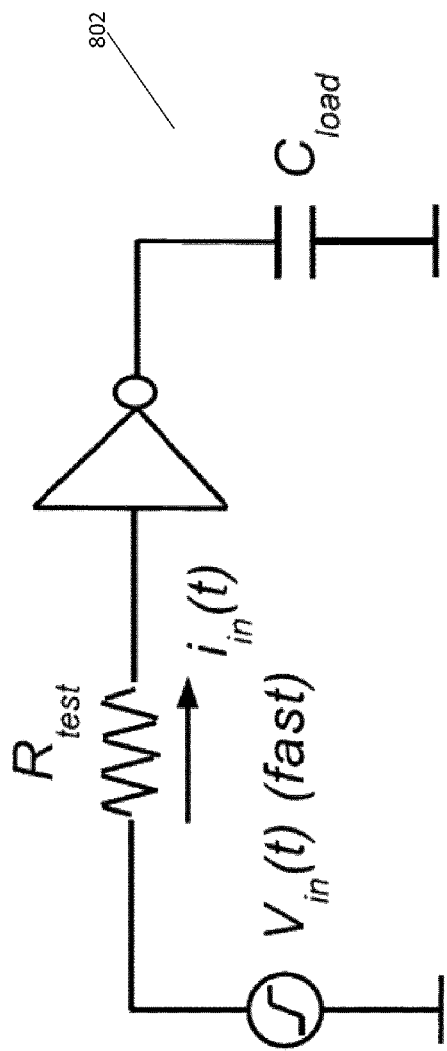
FIGS. 8a and 8b are circuit diagrams illustrating measurements for input parasitics model generation in accordance with one embodiment.
Figure 8B:
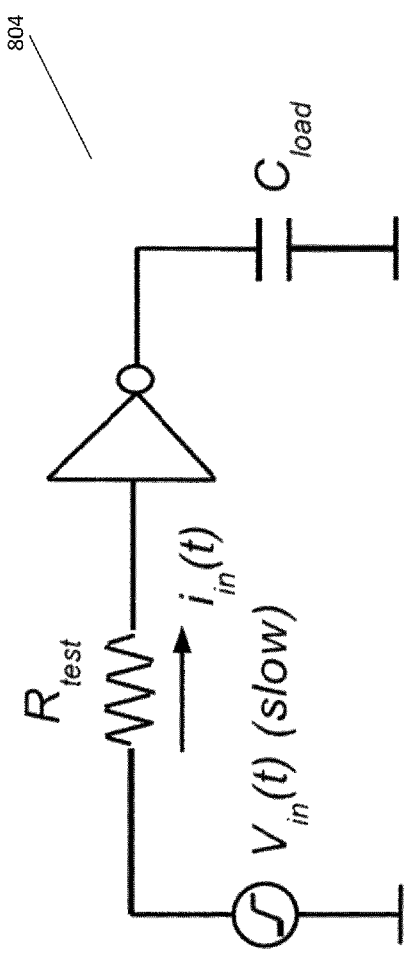

FIGS. 8a and 8b are circuit diagrams 802 and 804, respectively, illustrating measurements for input parasitics model generation in accordance with one embodiment. The input pin load models both the parasitic components (resistance and capacitance) as well as the average transistor gate capacitance. The input pin load is typically modeled as a simple lumped capacitance but in the case of high-accuracy gate models, more detailed input loads are required in one embodiment. The input pin load model is characterized using transient analysis. The input pin is driven by a voltage source connected directly or through some test device (e.g., a test resistance) and the output pin is connected to a load capacitance as shown in FIG. 8.

When the input signal is very fast as shown in FIG. 8a, the input current measures the charging of the "near" parasitic capacitance. When the signal is very slow, as shown in FIG. 8b, the current registers the charging of the parasitic capacitance as well as the transistor gate capacitance. For this reason, two distinct signals are applied to the input of the gate, a very fast switching input and a very slow switching one, in both rising and falling directions. The total charge that passes through the source is measured for different time intervals: a short time interval at the beginning of the input signal transition (1% to 30% transition) provides information about the near capacitance ($C_{in1}$ of FIG. 3) and a longer interval (1% to 99%) covering the transition of the slower signal provides information about the total input pin capacitance ($C_{in1}+C_{in2}+C_c$ of FIG. 3). The $C_{in2}$ can be computed only after the coupling cap $C_c$ is measured in one embodiment. The $R_{in}$ value can be estimated initially from a simple delay measurement, but its value is tuned during simulation in one embodiment.

In one embodiment, the capacitance is measured by performing the average of input current divided by the derivative of voltage with respect to time over the specified time range as follows:

$$C = \frac{\int_{T_3}^{T_2} \frac{I(t)}{V'(t)} dt}{T_2 - T_1} \text{ where } V'(t) = \frac{dV(t)}{dt}.$$

Nonlinear Capacitors Model

Figure 9:
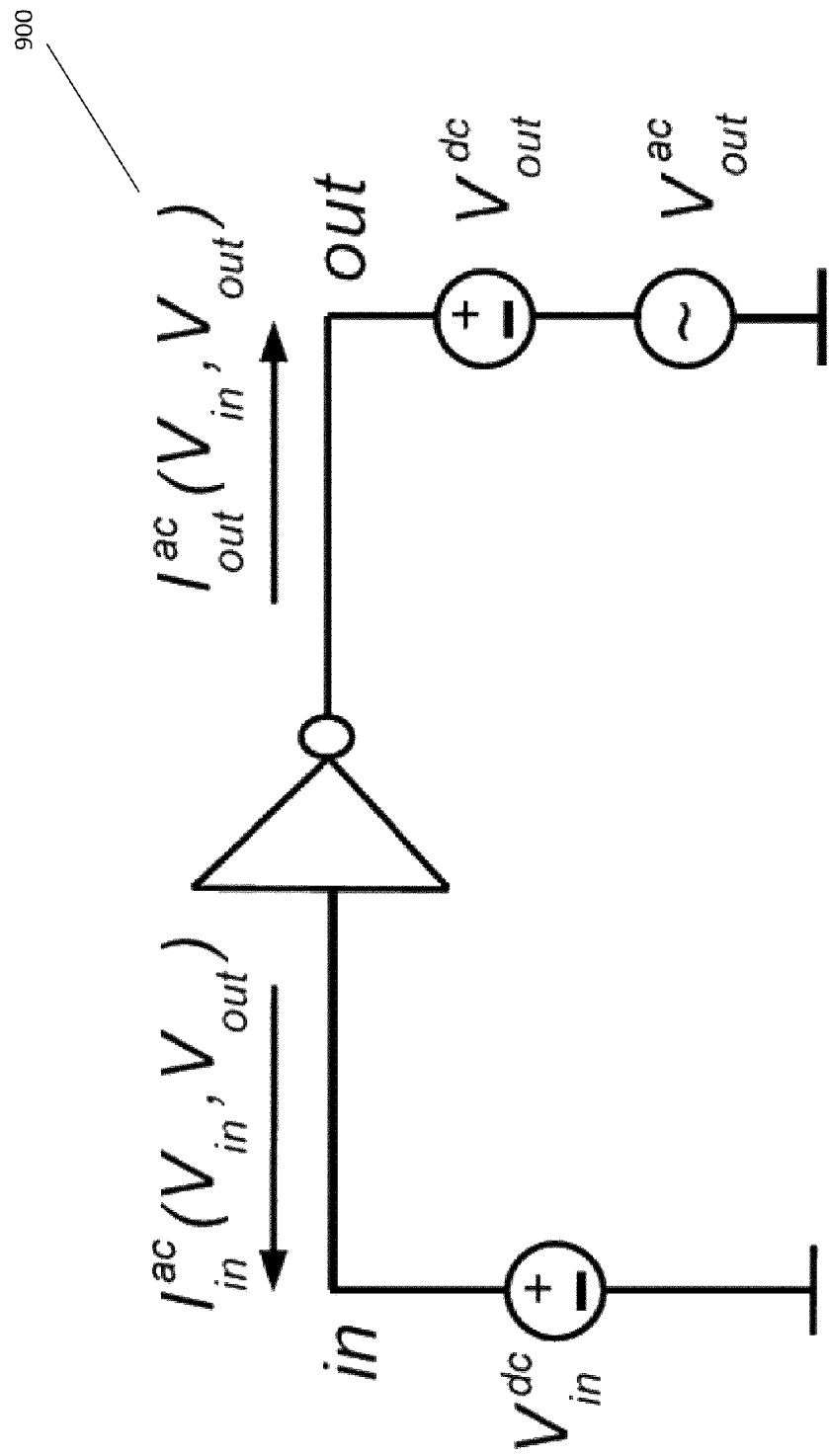
FIG. 9 is a circuit diagram illustrating coupling and output capacitor AC measurements for an inverter in order to determine capacitors for the nonlinear capacitors model in accordance with one embodiment.

FIG. 9 is a circuit diagram 900 illustrating coupling and output capacitor AC measurements for an inverter in order to determine capacitors for the nonlinear capacitors model in accordance with one embodiment. In general, the AC analysis is performed with the gate set in a specific DC operating point and the small high frequency signals are obtained using quasi-linear models of the transistors. The transistor in general becomes a current source in parallel with a resistor and a capacitor between drain and source. By measuring the small signal currents, real and imaginary parts, embodiments determine the small signal resistance and capacitance of the gate.

Figure 10:
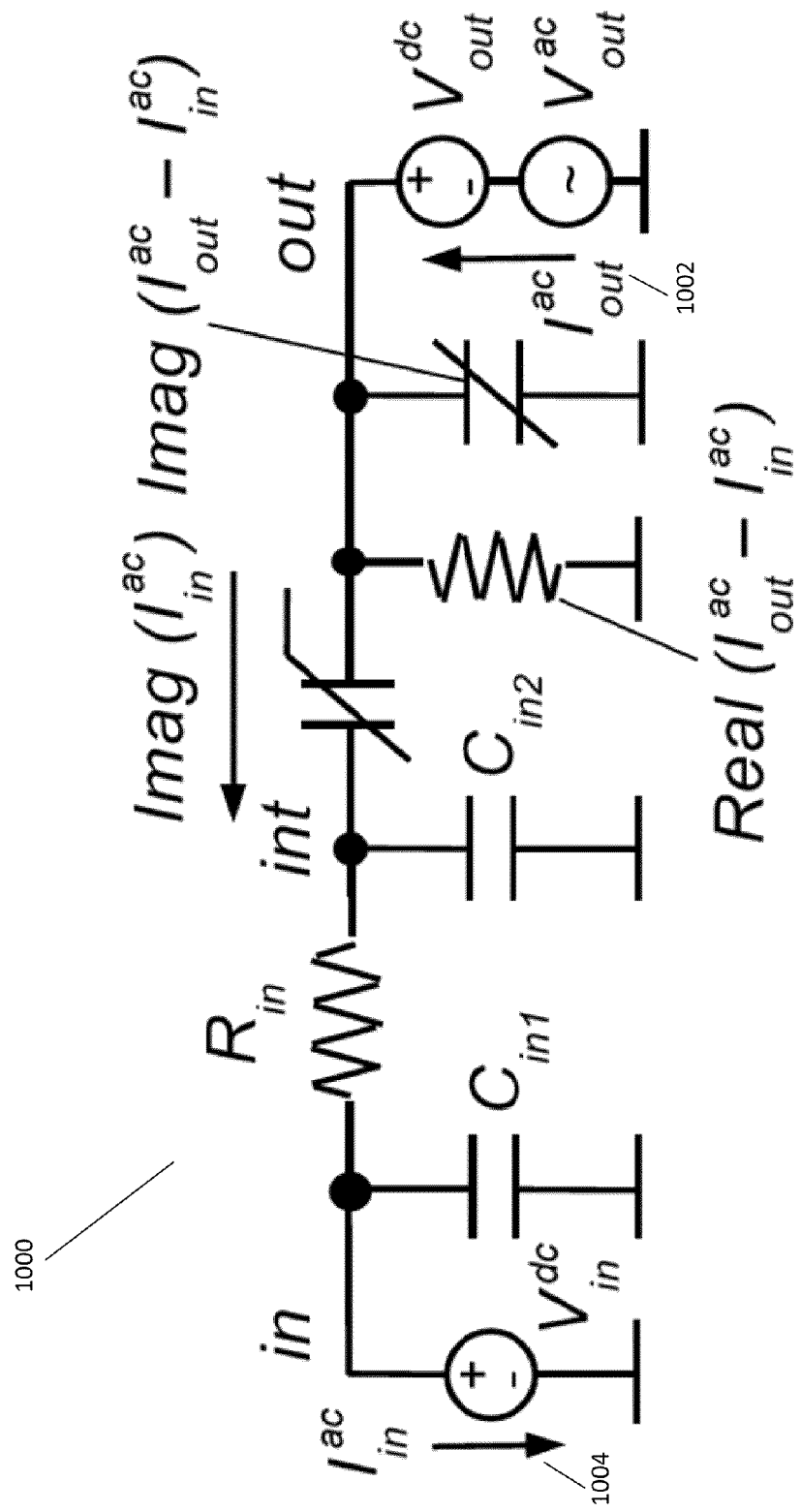
FIG. 10 is a circuit for generating a nonlinear capacitors model in accordance with one embodiment.

FIG. 10 is a circuit 1000 for generating a nonlinear capacitors model in accordance with one embodiment. For FIG. 10, the output AC source small signal current 1002 and the input DC source small signal 1004 current provide measurements for the model capacitors. For the model, the currents that are measured can be described as the currents that go through the coupling capacitor and the current that goes to ground through the output capacitor. The AC signal sources have very small amplitude (1 mV) and high frequency, in the range of frequencies that are consistent with the speed of the signals propagated through the gate. The current measured through the AC source in one embodiment can be represented as a complex value as follows:

$$I(j\omega) = I_{real}(\omega) + j \cdot \omega \cdot I_{imag}(\omega) =$$
$$V(j\omega) \cdot Y(j\omega) = 0.001 \cdot (Y_{real}(\omega) + j \cdot Y_{imag}(\omega))$$
$$I_{real}(\omega) + j \cdot \omega \cdot I_{imag}(\omega) = 0.001 \cdot \left(\frac{1}{R_{eqv}} + j \cdot \omega \cdot C_{eqv}\right)$$

which provides a method for computing the small signal capacitance at a given frequency (ω) in the neighborhood of a given DC operating point:

$$C_{eqv} = \frac{I_{imag}}{\omega}.$$

Figure 11:
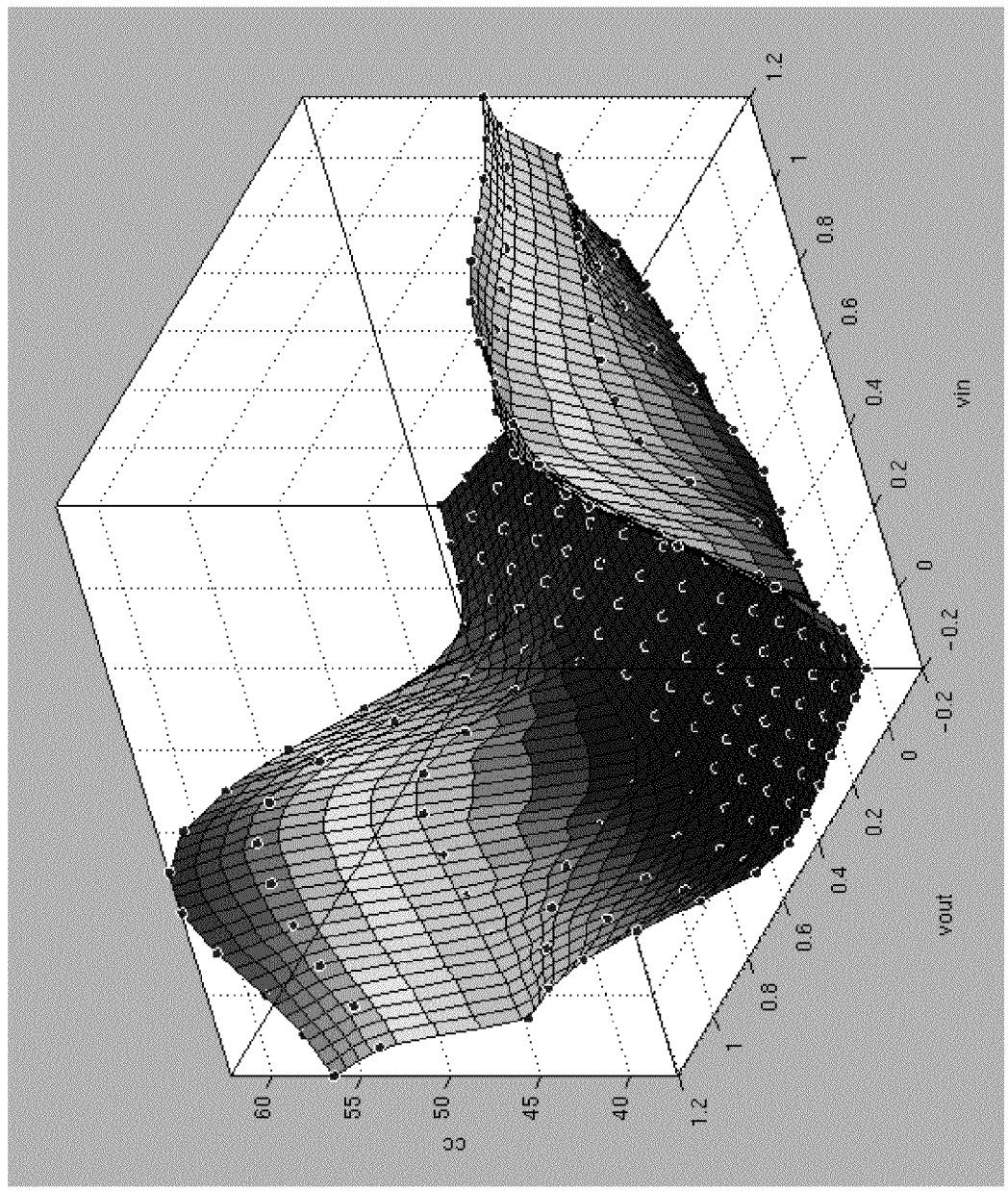
FIG. 11 is a scaled surface plot of the small signal coupling capacitance for different input and output voltage points in accordance with one embodiment.
Figure 12:
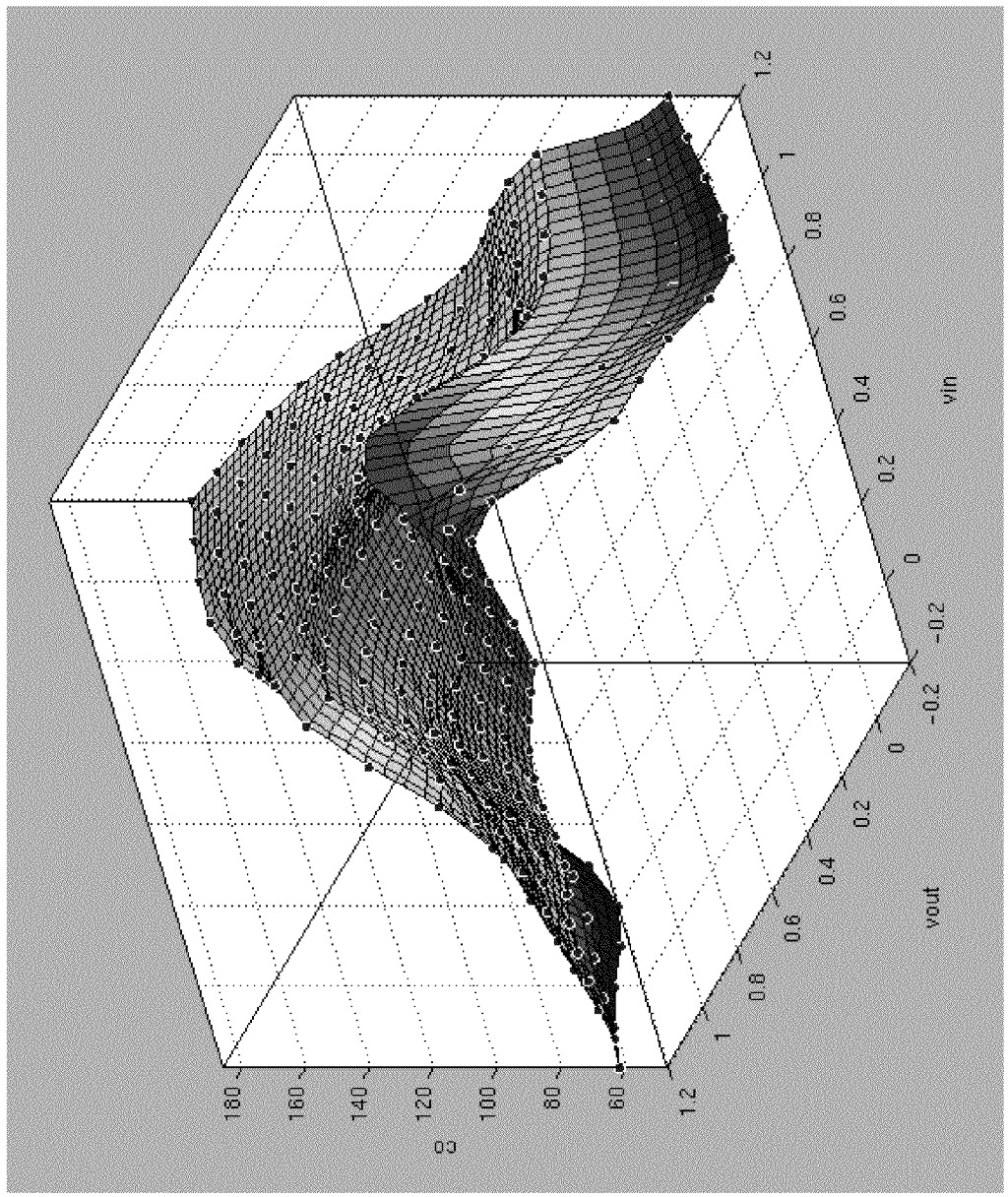
FIG. 12 is a scaled surface plot of the small signal output capacitance for different input and output voltage points in accordance with one embodiment.

The coupling capacitor $C_c$ and the output capacitor $C_{out}$ values of FIG. 3 depend heavily on the operating point and have large variations in size. FIGS. 11 and 12 illustrate the typical variation profile of the coupling capacitor value and of the output capacitor value as a function of input-output operating point. FIG. 11 is a scaled surface plot of the small signal coupling capacitance for different input and output voltage points in accordance with one embodiment. FIG. 12 is a scaled surface plot of the small signal output capacitance for different input and output voltage points in accordance with one embodiment.

In one embodiment, the highly nonlinear capacitors are modeled using hardware description language (e.g., Verilog) models similar to the DC current source, but this may significantly slow down the macro model simulation. In another embodiment, the capacitors are modeled by using curve-fitted polynomial models that describe the variation of the capacitance value with the node voltages. In another embodiment, the capacitors are modeled using some lumped capacitance value and are then tuned depending on gate operating conditions.

Figure 13A:
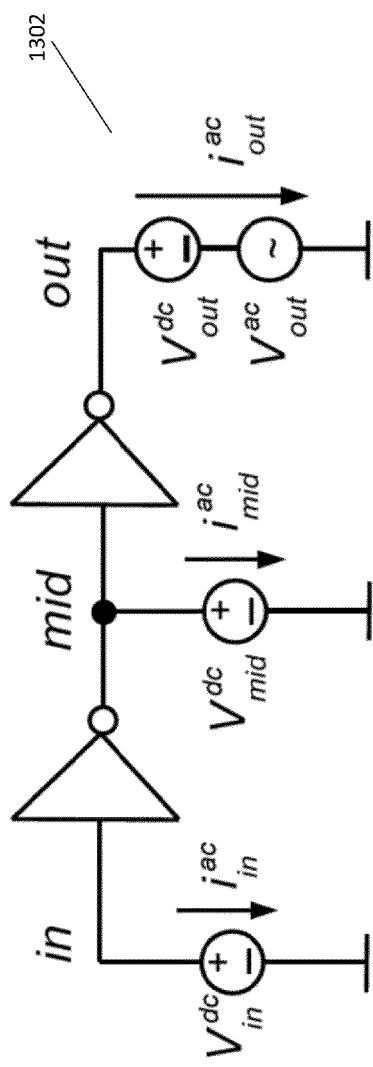
FIG. 13a is a circuit diagram illustrating a setup for measuring the output inverter stage output capacitor and coupling capacitor in accordance with one embodiment.
Figure 13B:
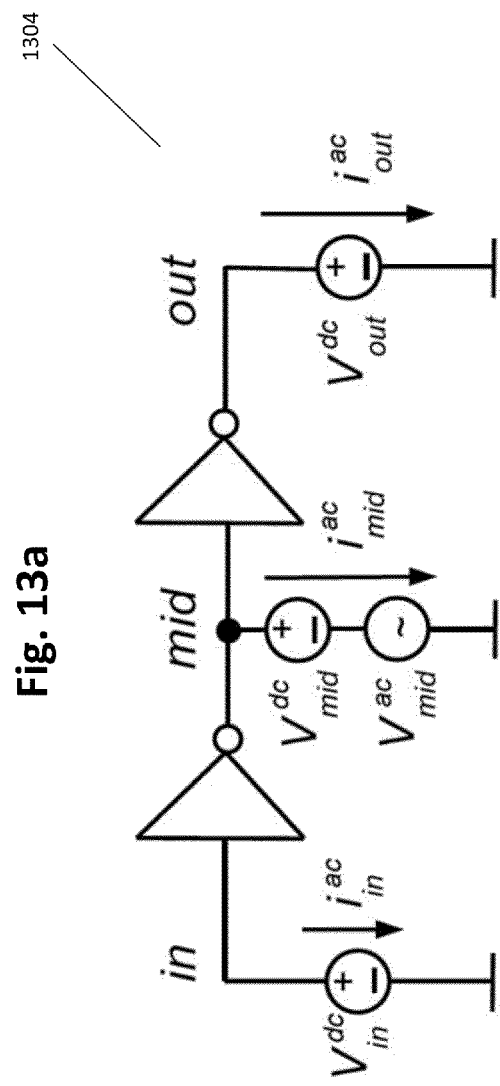
FIG. 13b is a circuit diagram illustrating a setup for measuring the input stage coupling capacitor and middle node capacitor in accordance with one embodiment.

For a buffer, the capacitance measurements are more difficult because the small signal currents in the middle node cannot be easily measured. FIG. 13a is a circuit diagram 1302 illustrating a setup for measuring the output inverter stage output capacitor and coupling capacitor in accordance with one embodiment. FIG. 13b is a circuit diagram 1304 illustrating a setup for measuring the input stage coupling capacitor and middle node capacitor in accordance with one embodiment. In FIG. 13b, the output stage can be, depending on the operating point, in a state where it amplifies the small signal present on its input. In that case, the output current $i^{ac}_{out}$ is larger than just the current flowing through the coupling capacitor and in turn will have an effect on the total small signal current $i^{ac}_{mid}$. In addition, the middle node ground capacitance is comprised of the first stage output parasitic capacitance and the second stage transistor gate capacitance. For these reasons, the middle node nonlinear capacitance is considered to be one lumped value which is estimated by the AC analysis but its value is tuned during optimization.

The initial models of the non-linear coupling capacitors and of the non-linear output node capacitors in one embodiment use $4^{th}$ order polynomials that describe the dependency of the average capacitance value with the output node voltage (i.e., the "$a_i$" coefficients disclosed below). This initial model is determined from the measurements performed during the AC high frequency analysis. The model is further tuned during optimization and a two-dimensional polynomial is added (the "$k_j$" coefficients disclosed below are tuned by the optimization). The final expression of the nonlinear capacitance has the following form:

$$C(V_{in}, V_{out}) = (k_0 + k_1 \cdot V_{in} + k_2 \cdot V_{out} + k_3 \cdot V_{in} \cdot V_{out}) \cdot (\alpha_0 + \alpha_1 \cdot V_{out} + \alpha_2 \cdot V_{out}^2 + \alpha_3 \cdot V_{out}^3 + \alpha_4 V_{out}^4).$$

For the above equation of the non-linear coupling capacitors, the first part of the product is considered the "tuning part" and the second part is considered the "modeled part". The tuning part includes "k" coefficients that are generated in response to the model tuning, as disclosed below. The modeled part in one embodiment models the surface plots of FIGS. 11 and 12.

Model Tuning

Because the initial nonlinear model characterization is using DC operating point and AC analysis, the dynamic characteristics are not always completely captured and the resulting accuracy may not meet the clock analysis simulation requirements. Therefore, in one embodiment additional tuning is performed to improve the model accuracy. As disclosed above, in one embodiment the tuning provides the "k" coefficients in the model of the non-linear capacitors, while a lookup table is used to tune the current sources.

Figure 14:
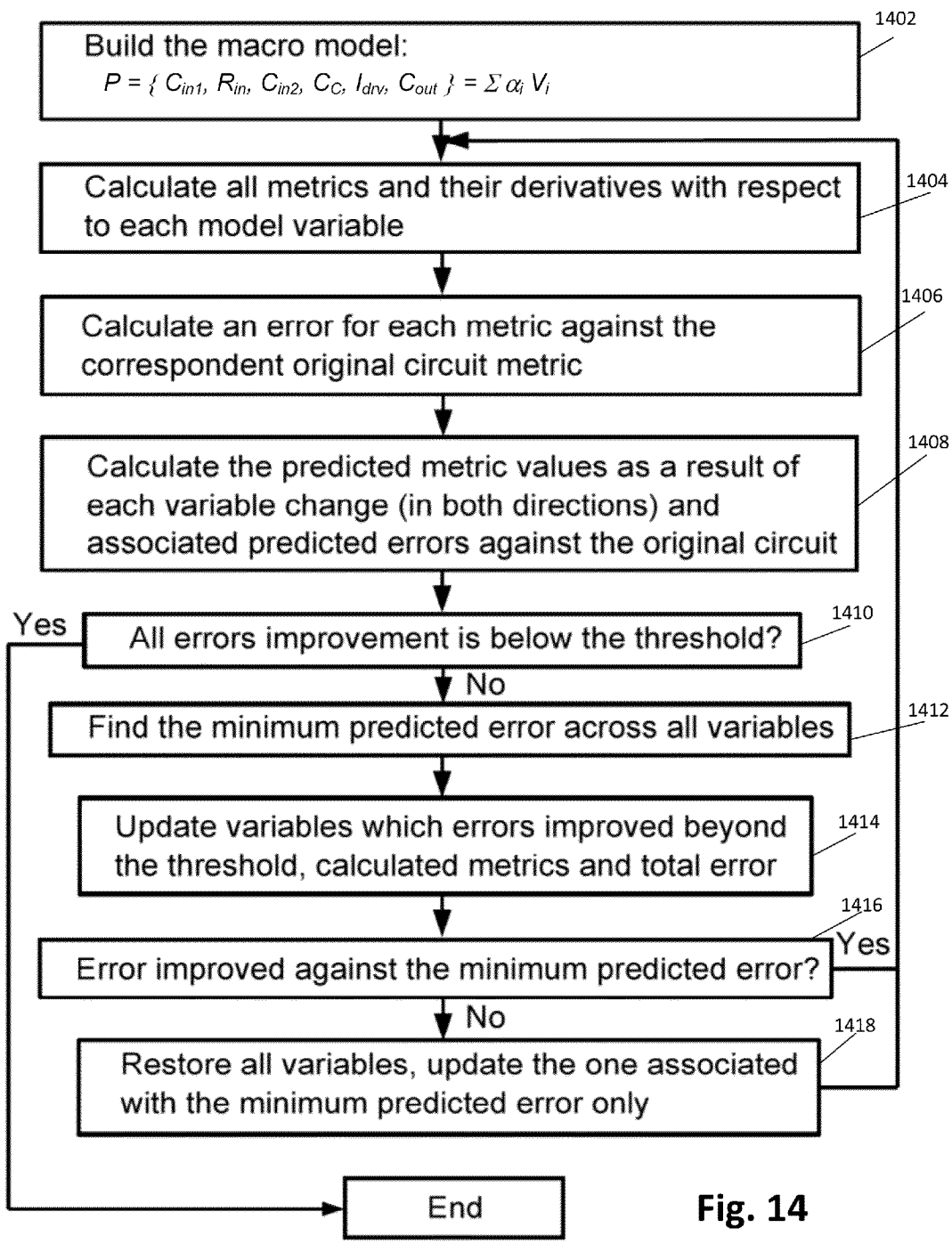
FIG. 14 is a flow diagram of the functionality of the IC clock analysis simulation module of FIG. 1 when performing model tuning in accordance with one embodiment.

FIG. 14 is a flow diagram of the functionality of IC clock analysis simulation module 16 of FIG. 1 when performing model tuning in accordance with one embodiment. At 1402, the macro model is built as previously disclosed. In one embodiment, the macro model is expressed as:

$$P = \{C_{in1}, R_{in}, C_{in2}, C_C, I_{drv}, C_{out}\} = \Sigma \alpha_i V_i,$$

where $R_{in}$, $C_{in2}$, $C_c$, $I_{drv}$ and $C_{out}$ are macro model parameters described in conjunction with FIG. 3 above. Specifically, $C_{in1}$ and $C_{in2}$ are capacitors and $R_{in}$ is a resistor representing input parasitics. $I_{drv}$ is a non-linear current source. $C_c$ and $C_{out}$ are nonlinear coupling capacitors. $V_i$ are the voltages at input "in", internal "int" and output "out" nodes and $\alpha_i$ are tuning coefficients applied to the model parameters.

At 1402, the initial model parameters are calculated. At 1404, all metrics and their derivatives with respect to each model variable are calculated.

The model tuning begins at 1406 with the initial macro model error evaluation. The error is calculated as a root mean square ("RMS") difference between each metric measured for the original circuit and macro model. The following metrics $\{t_1, \ldots t_N\}$ are used for the actual circuit and its macro model for the tuning procedure to calculate error and accurately fit the clock signal delay and slew rate for inverter model 300 of FIG. 3:

rise and fall delay across the input parasitics (between the nodes in and int on inverter model 300);

rise and fall time at the inverter input (node int on inverter model 300);

rise and fall delay from the inverter input to output (nodes int and out on inverter model 300); and rise and fall time at the inverter output (node out on inverter model 300).

The procedure is performed for both fast and slow rising input signals.

The tuning procedure for the buffer model is generally the same as for the inverter model (i.e., the signals at primary input, buffer input and buffer output are measured). Assuming that initially there is an actual circuit metrics vector $$\{t_1^C, \ldots, t_N^C\}$$

and corresponding macro model metrics vector $$\{t_1^M, \ldots, t_N^M\}$$

then the model error is calculated as $$\varepsilon = \sqrt{(t_1^M - t_1^C)^2 + (t_2^M - t_2^C)^2 + \ldots + (t_N^M - t_N^C)^2}.$$

Coefficients in the expressions used to calculate the value for each device incorporated into the macro model are considered as variables for the tuning procedure: $\alpha_1, \alpha_2, \ldots \alpha_M$. At each iteration, the matrix of small change derivatives for all model metrics with respect to each variable is calculated in one embodiment as follows:

$$\begin{bmatrix} \partial t_1/\partial \alpha_1 & \partial t_1/\partial \alpha_2 & \ldots & \partial t_1/\partial \alpha_M \\ \partial t_2/\partial \alpha_1 & \partial t_2/\partial \alpha_2 & \ldots & \partial t_2/\partial \alpha_M \\ \ldots \\ \partial t_N/\partial \alpha_1 & \partial t_N/\partial \alpha_2 & \ldots & \partial t_N/\partial \alpha_M \end{bmatrix}$$

At 1408, all metric values predicted as a result of each variable change in both directions are calculated using the above derivatives matrix as follows:

$$t_{ij}^P = t_i \pm \left(\frac{\partial t_i}{\partial \alpha_j}\right) \Delta \alpha_j,$$

where $\Delta \alpha_j$ is a user defined small value, and a predicted error as a result of each variable change is calculated as follows:

$$\varepsilon_j^P = \sqrt{(t_{1j}^P - t_1^C)^2 + (t_{2j}^P - t_2^C)^2 + \ldots + (t_{Nj}^P - t_N^C)^2}.$$

At 1410, it is determined if all errors improvement is below a threshold. In one embodiment, the threshold is a very small value defined by the user for metrics error. In one embodiment, the threshold is generally a fraction of a picosecond such as $1.0 \times 10^{-15}$ seconds.

At 1412, the minimum predicted error is found across all variables. At 1414, the variables in which errors improved beyond the threshold are updated, and the metrics and total error are calculated.

The minimum predicted error $$\varepsilon_{min}^P$$

across the vector $$\varepsilon^P = \{\varepsilon_1^P, \varepsilon_2^P \ldots, \varepsilon_M^P\}$$

determines the variable which will produce the best macro model accuracy for the next iteration. Further, the predicted error improvement is estimated as the difference between current error $\epsilon_j$ and predicted error $$\varepsilon_j^P.$$

If, at 1410, the error improvement does not exceed the user-defined threshold across all variables, then tuning is considered accomplished as the best model accuracy reached. Otherwise, those variables whose respective error improvement exceeded the threshold are updated at 1414 and simulation is performed in order to determine the metrics values and the total RMS error against the actual circuit across all variables. If the total error is greater than $$\varepsilon_{min}^P$$

then all updated variables are restored to their previous values and the variable corresponding to the minimum predicted error $$\varepsilon_{min}^P$$

is updated only at 1418. Otherwise, all variables are accepted with their new values (Yes at 1416) and iterations are repeated (functionality moves to 1404) until the error does not improve anymore (No at 1416) or a maximum number of iterations is reached. The final set of variables is considered as the most accurate setup for the macro model across all metrics.

As disclosed, one embodiment performs clock analysis of an integrated circuit using a circuit simulator such as SPICE, but replacing each library cell (e.g., inverters and buffers) with a macro model. The macro model is incorporated in the SPICE deck instead of the netlist. The macro model is tuned/optimized specific to the IC. The macro model replaces the netlist, which provides a listing of every transistor, capacitor, etc. of the IC, with a model of each library cell that uses non-linear devices. The macro models, compared to the netlist, are a relatively simple model of the complex circuit but maintains the behavior of interest for the clock analysis (e.g., the timing of signal propagation). The macro model in one embodiment models gates that have a single input and a single output. Therefore, embodiments cause a large improvement in performance during simulation compared to using the netlist.

Several embodiments are specifically illustrated and/or described herein. However, it will be appreciated that modifications and variations of the disclosed embodiments are covered by the above teachings and within the purview of the appended claims without departing from the spirit and intended scope of the invention.

What is claimed is:

1. A non-transitory computer readable medium having instructions stored thereon that, when executed by a processor, causes the processor to perform a clock analysis, the clock analysis comprising:
   generating an electrical netlist of an integrated circuit that comprises a plurality of gates and a layout;
   modeling each of the gates, the modeling comprising generating macro models comprising a nonlinear current source model, an input parasitics model and a nonlinear capacitors model;
   tuning the macro models, wherein the tuning is based upon a calculated difference between a first rise-and-fall delay within the integrated circuit and a second rise-and-fall delay within the macro models;
   generating a simulation deck from the electrical netlist and the tuned macro models; and
   performing clock analysis simulation based on the simulation deck.

2. The computer readable medium of claim 1, wherein the simulation deck is a Simulation Program with Integrated Circuit Emphasis (SPICE) deck, and the clock analysis simulation is executing SPICE.

3. The computer readable medium of claim 1, wherein the macro models each comprise a single input and a single output.

4. The computer readable medium of claim 1, wherein the plurality of gates comprise at least one of a buffer or inverter.

5. The computer readable medium of claim 1, wherein the nonlinear current source model models an output current as a function of input voltages and output voltages.

6. The computer readable medium of claim 1, wherein the input parasitics model models resistance and capacitance parasitic components and an average transistor gate capacitance.

7. The computer readable medium of claim 1, wherein the nonlinear capacitors model models a gate to drain coupling capacitance and an output node capacitance to ground.

8. The computer readable medium of claim 1, wherein the tuning the macro models tunes a dynamic characterization of the models.

9. A method, performed by at least one processor, for performing a clock analysis of an integrated circuit, the method comprising:
  generating an electrical netlist of a layout of the integrated circuit;
  receiving a cell library of gates of the integrated circuit;
  generating a macro model for each of the gates, each macro model comprising at least one of a nonlinear current source model, an input parasitics model or a nonlinear capacitors model;
  tuning the macro models, wherein the tuning is performed by the at least one processor, and the tuning is based upon a calculated difference between a first rise-and-fall delay within the integrated circuit and a second rise-and-fall delay within the macro models;
  generating a simulation deck from the electrical netlist and the tuned macro models; and
  performing clock analysis simulation based on the simulation deck.

10. The method of claim 9, wherein the simulation deck is a Simulation Program with Integrated Circuit Emphasis (SPICE) deck, and the clock analysis simulation is executing SPICE.

11. The method of claim 9, wherein the macro models each comprise a single input and a single output.

12. The method of claim 9, wherein the plurality of gates comprise at least one of a buffer or inverter.

13. The method of claim 9, wherein the tuning the macro models comprises tuning a dynamic characterization of the models.

14. The method of claim 9, wherein the nonlinear current source model models an output current as a function of input voltages and output voltages.

15. An integrated circuit clock analysis system comprising:
  a processor; and
  a memory coupled to the processor storing instructions that cause the system to perform the analysis comprising:
    receive a cell library of gates of the integrated circuit;
    generate a macro model for each of the gates, each macro model comprising at least one of a nonlinear current source model, an input parasitics model or a nonlinear capacitors model;
    tune the macro models, wherein the tuning is based upon a calculated difference between a first rise-and-fall delay within the integrated circuit and a second rise-and-fall delay within the macro models;
    generate a simulation deck from an electrical netlist of a layout of the integrated circuit and the tuned macro models; and
    perform clock analysis simulation based on the simulation deck.

16. The system of claim 15, wherein the simulation deck is a Simulation Program with Integrated Circuit Emphasis (SPICE) deck, and the clock analysis simulation is executing SPICE.

17. The system of claim 15, wherein the macro models each comprise a single input and a single output.

18. The system of claim 15, wherein the plurality of gates comprise at least one of a buffer or inverter.

19. The system of claim 15, wherein the tune the macro models comprises tuning a dynamic characterization of the models.

20. The system of claim 15, wherein the input parasitics model models resistance and capacitance parasitic components and an average transistor gate capacitance.

* * * * *

UNITED STATES PATENT AND TRADEMARK OFFICE
CERTIFICATE OF CORRECTION

PATENT NO. : 8,464,195 B1
APPLICATION NO. : 13/541127
DATED : June 11, 2013
INVENTOR(S) : Korobkov et al.

It is certified that error appears in the above-identified patent and that said Letters Patent is hereby corrected as shown below:

In the Specification:

In column 7, line 62-63, delete " $(\alpha_0+\alpha_1.V_{out}+\alpha_2.V_{out}^2+\alpha_3.V_{out}^3+\alpha_4 V_{out}^4).$ " and insert -- $(a_0+a_1.a_{out}+a_2.a_{out}^2+a_3.a_{out}^3+a_4 a_{out}^4)$ --, therefor.

Signed and Sealed this
Eighth Day of October, 2013

Teresa Stanek Rea
*Deputy Director of the United States Patent and Trademark Office*